United States Patent
Murashige et al.

(10) Patent No.: US 10,937,591 B2
(45) Date of Patent: Mar. 2, 2021

(54) COIL UNIT, WIRELESS POWER TRANSMISSION DEVICE, WIRELESS POWER RECEIVING DEVICE, AND WIRELESS POWER TRANSMISSION SYSTEM

(71) Applicant: TDK CORPORATION, Tokyo (JP)

(72) Inventors: Takuya Murashige, Tokyo (JP); Shoma Asai, Tokyo (JP); Hideo Asano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 2 days.

(21) Appl. No.: 16/366,480

(22) Filed: Mar. 27, 2019

(65) Prior Publication Data
US 2019/0304677 A1   Oct. 3, 2019

(30) Foreign Application Priority Data
Mar. 30, 2018  (JP) .............................. JP2018-070103

(51) Int. Cl.
*H02J 50/12* (2016.01)
*H01F 27/30* (2006.01)
*H01F 27/32* (2006.01)
*H01F 38/14* (2006.01)
*B60L 53/12* (2019.01)
*B60L 53/30* (2019.01)
*H01F 27/28* (2006.01)
*H02J 7/02* (2016.01)

(52) U.S. Cl.
CPC .............. *H01F 38/14* (2013.01); *B60L 53/12* (2019.02); *B60L 53/30* (2019.02); *H01F 27/2823* (2013.01); *H01F 27/2828* (2013.01); *H01F 27/306* (2013.01); *H01F 27/323* (2013.01); *H02J 50/12* (2016.02); *H02J 7/025* (2013.01)

(58) Field of Classification Search
CPC ........ B60L 53/12; B60L 53/30; H01F 27/266; H01F 27/2823; H01F 27/2828; H01F 27/2871; H01F 27/306; H01F 27/323; H01F 27/324; H01F 38/14; H01F 2027/329; H02J 7/025; H02J 50/10; H02J 50/12
See application file for complete search history.

(56) References Cited

U.S. PATENT DOCUMENTS

| | | | | |
|---|---|---|---|---|
| 9,264,107 B2* | 2/2016 | Jung | ................. | H02J 7/025 |
| 9,508,484 B2* | 11/2016 | Scholz | ................ | H01F 27/2804 |
| 9,543,065 B2* | 1/2017 | Kurihara | ................. | H01F 38/14 |
| 9,805,856 B2* | 10/2017 | Sasaki | ................... | H01F 27/266 |
| 2002/0041176 A1* | 4/2002 | Eki | ......... | H02J 7/025 320/109 |
| 2006/0068602 A1* | 3/2006 | Kamijima | ............. | H01F 41/041 438/780 |
| 2010/0147377 A1* | 6/2010 | Ishihara | ................ | H01L 31/048 136/256 |
| 2012/0086394 A1* | 4/2012 | Hui | ...................... | G05D 1/0038 320/108 |

(Continued)

FOREIGN PATENT DOCUMENTS

JP   2017-084840 A   5/2017

*Primary Examiner* — Levi Gannon
(74) *Attorney, Agent, or Firm* — Oliff PLC (57) ABSTRACT

A coil unit includes a coil configured by winding a conductive wire in a spiral shape, a magnetic body, and a base member disposed between the coil and the magnetic body, wherein the coil and the magnetic body are fixed to the base member.

14 Claims, 7 Drawing Sheets

(56) References Cited

U.S. PATENT DOCUMENTS

| | | | |
|---|---|---|---|
| 2014/0327391 A1* | 11/2014 | Niederhauser | B60L 53/126 |
| | | | 320/108 |
| 2015/0099920 A1* | 4/2015 | Dobler | H01F 3/10 |
| | | | 600/14 |
| 2017/0162316 A1* | 6/2017 | Endo | H01F 27/2804 |
| 2018/0137970 A1* | 5/2018 | Doi | H01F 27/367 |
| 2018/0286558 A1* | 10/2018 | Yokoyama | H01F 17/0013 |

* cited by examiner

COIL UNIT, WIRELESS POWER TRANSMISSION DEVICE, WIRELESS POWER RECEIVING DEVICE, AND WIRELESS POWER TRANSMISSION SYSTEM

BACKGROUND

The present disclosure relates to a coil unit, a wireless power transmission device, a wireless power receiving device, and a wireless power transmission system.

Priority is claimed on Japanese Patent Application No. 2018-070103, filed on Mar. 30 2018, the content of which is incorporated herein by reference.

A wireless power transmission technology is known. The wireless power transmission technology transmits electric power wirelessly using an electromagnetic induction mechanism between a primary (power transmission) coil and a secondary (power receiving) coil. The wireless power transmission technology uses linkage of an alternating magnetic flux generated in a power transmission-side coil to a power receiving-side coil.

In the wireless power transmission technology, reduction in thickness and size of a coil unit including a coil and a magnetic body is required. In the coil unit in the related art, a coil and a magnetic body are accommodated in an accommodating case (Japanese Unexamined Patent Application, First Publication No. 2017-84840, for example).

Japanese Unexamined Patent Application, First Publication No. 2017-84840 discloses a non-contact power transmission unit including a power transmission coil, a magnetic body, a base member and an accommodating case. In the non-contact power transmission unit disclosed in Japanese Unexamined Patent Application, First Publication No. 2017-84840, the accommodating case accommodates the magnetic body, the base member and the power transmission coil in sequence. The non-contact power transmission unit secures an interval between the power transmission coil and the magnetic body using a spacer region on the base member.

SUMMARY

In wireless power transmission, when a distance between a power transmission coil and a magnetic body is varied, since properties of the power transmission coil are varied, minimization of variation in properties of the power transmission coil is required simultaneously with reduction in thickness and size of a coil unit.

Incidentally, in the non-contact power transmission unit disclosed in Japanese Unexamined Patent Application, First Publication No. 2017-84840, the power transmission coil and the magnetic body are accommodated in the accommodating case, the magnetic body is fixed to the base member, and the power transmission coil is accommodated in a coil positioning groove section of the accommodating case and fixed by filler. Accordingly, in the non-contact power transmission unit disclosed in Japanese Unexamined Patent Application, First Publication No. 2017-84840, dispersion may easily occur in a distance between the power transmission coil and the magnetic body, properties of the power transmission coil may be varied, and power transmission performance may be decreased.

The present disclosure provides a coil unit capable of minimizing variation in properties of a power transmission coil due to generation of dispersion in a distance between a power transmission coil and a magnetic body, and a wireless power transmission device, a wireless power receiving device and a wireless power transmission system each including the coil unit.

A coil unit of the present disclosure includes a coil configured by winding a conductive wire in a spiral shape, a magnetic body, and a base member disposed between the coil and the magnetic body, wherein the coil and the magnetic body are fixed to the base member.

According to the present disclosure, it is possible to provide a coil unit capable of minimizing variation in properties of a power transmission coil due to generation of dispersion in a distance between a power transmission coil and a magnetic body, and a wireless power transmission device, a wireless power receiving device and a wireless power transmission system each including the coil unit.

DETAILED DESCRIPTION OF THE INVENTION

Hereinafter, an embodiment of the present disclosure will be described in detail with reference to the accompanying drawings. In the drawings used in the following description, for the convenience of easy understanding of characteristics, characteristic parts may be enlarged, and dimensional ratios or the like between components may not necessarily be the same as actual ratios. Materials, dimensions, or the like, exemplified in the following description are merely examples. The present disclosure is not necessarily limited thereto and appropriate changes may be made without departing from the spirit of the present disclosure.

<Wireless Power Transmission System>

Figure 1:
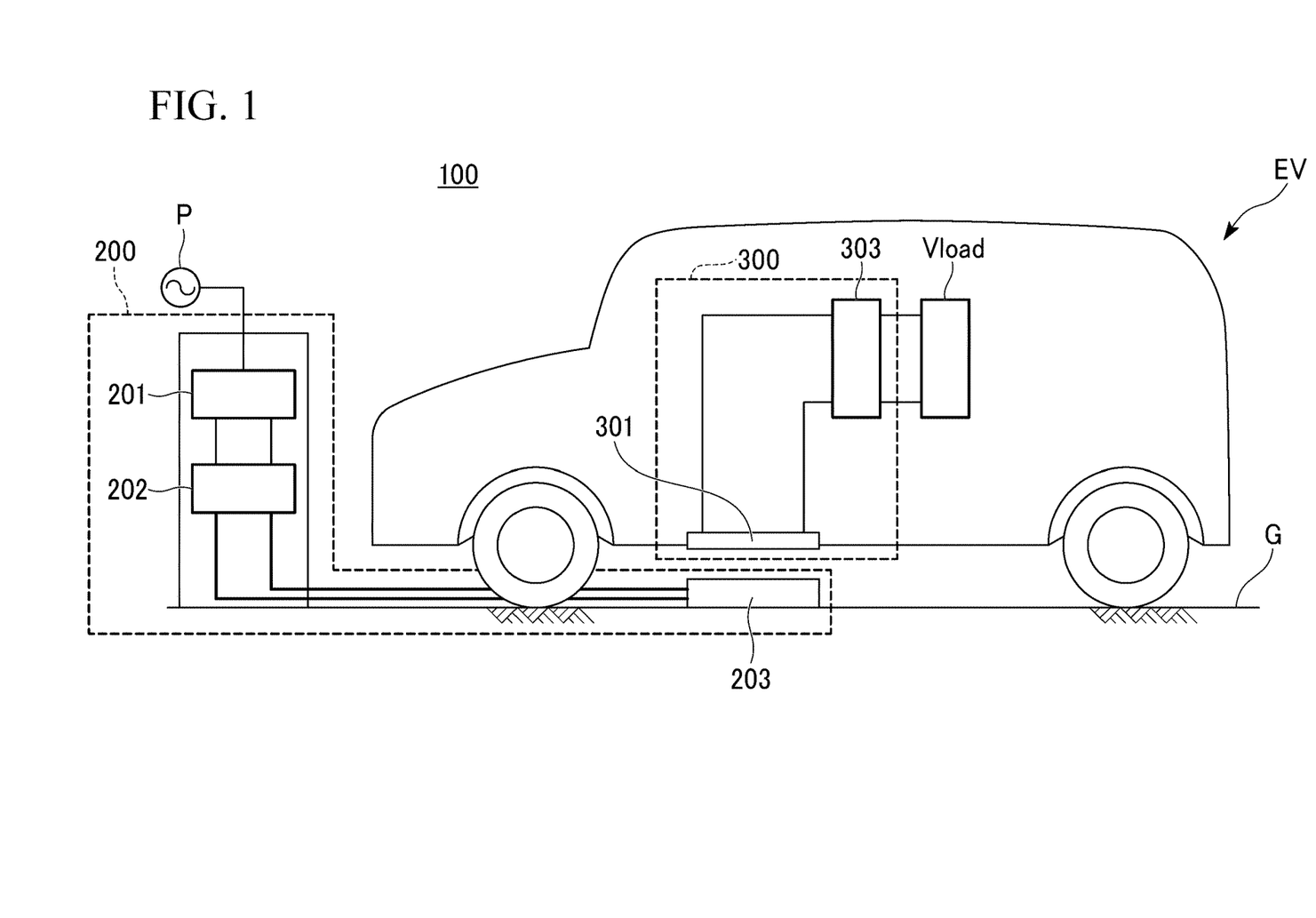
FIG. 1 is a configuration view showing an example of a wireless power transmission system according to an embodiment.
Figure 2:
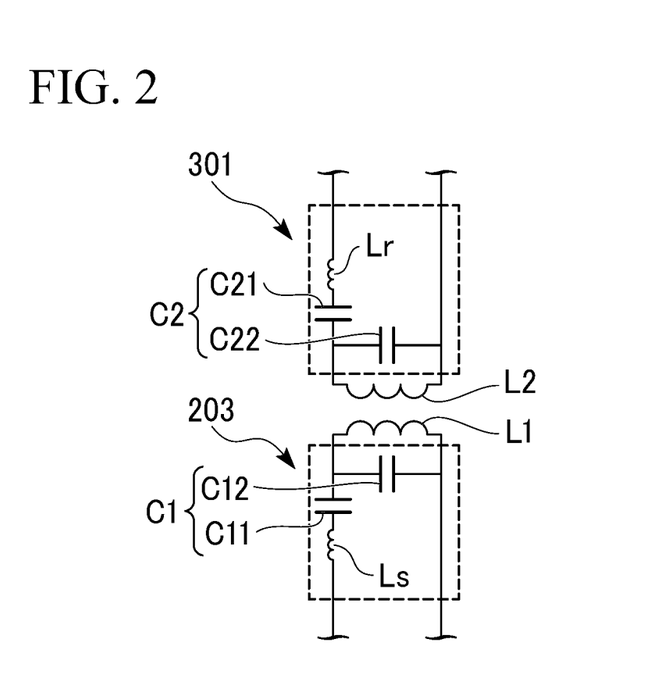
FIG. 2 is a circuit diagram showing a configuration of a power transmission coil unit and a power receiving coil unit of the wireless power transmission system of FIG. 1.

First, as an embodiment of the present disclosure, for example, a wireless power transmission system 100 shown in FIG. 1 and FIG. 2 will be described. FIG. 1 is a configuration view showing an example of the wireless power transmission system 100. FIG. 2 is a circuit diagram showing a configuration of a power transmission coil unit 203 and a power receiving coil unit 301 of the wireless power transmission system 100.

As shown in FIG. 1 and FIG. 2, the wireless power transmission system 100 of the embodiment performs wireless charging of a battery (a secondary battery) mounted on an electric automobile EV. The electric automobile EV is an electrically driven vehicle (a moving body) that travels due to being driven by a motor using electric power charged into the battery. While the wireless power transmission system 100 is applied to the electric automobile EV in the embodiment, the wireless power transmission system may be applied to a moving body, a mobile device, or the like, other than the electric automobile EV, in another embodiment.

The wireless power transmission system 100 includes a wireless power transmission device 200 and a wireless power receiving device 300. The wireless power transmission device 200 is installed on the ground G on the side of charging equipment. The wireless power receiving device 300 is mounted on the electric automobile EV.

The wireless power transmission device 200 includes a conversion circuit 201, a power transmission circuit 202, and the power transmission coil unit 203. The wireless power receiving device 300 includes the power receiving coil unit 301 and a rectification smoothing circuit 303. Further, a load Vload is disposed outside the wireless power receiving device 300.

The conversion circuit 201 functions as an AC/DC power supply electrically connected to an external commercial power supply P and configured to convert an alternating current voltage input from the commercial power supply P into a desired direct current voltage. The conversion circuit 201 is electrically connected to the power transmission circuit 202. The conversion circuit 201 supplies the converted direct current voltage to the power transmission circuit 202.

For the conversion circuit 201, any configuration may be used as long as a direct current voltage is output to the power transmission circuit 202 and the configuration is not particularly limited. As the conversion circuit 201, a conversion circuit obtained by combining a rectifying circuit configured to rectify an alternating current voltage and convert the alternating current voltage into a direct current voltage and a power factor correction (PFC) circuit configured to improve a power factor; a conversion circuit obtained by combining a rectifying circuit and a switching circuit such as a switching converter or the like, or the like, may be exemplified.

The power transmission circuit 202 converts a direct current voltage supplied from the conversion circuit 201 into an alternating current voltage. As the power transmission circuit 202, a switching circuit or the like to which a plurality of switching elements are bridge-connected may be exemplified. The power transmission circuit 202 is electrically connected to the power transmission coil unit 203. The power transmission circuit 202 supplies an alternating current voltage having a driving frequency controlled on the basis of a resonance frequency of a first LC resonance circuit, which will be described below, included in the power transmission coil unit 203, to the power transmission coil unit 203.

The power transmission coil unit 203 includes a first LC resonance circuit, a base member (not shown) and a magnetic body (not shown). The base member (not shown) and the magnetic body (not shown) will be described later in detail in the section for the "<Coil unit>," which will be described below.

The first LC resonance circuit includes a power transmission coil L1 and a power transmission-side capacitor C1. When a resonance frequency of the first LC resonance circuit approaches (including also "coincides with") a resonance frequency on the side of the power receiving coil unit 301, magnetic resonance type wireless power transmission becomes possible. In addition, in another embodiment, the power transmission coil unit may not include an LC resonance circuit. That is, in another embodiment, the power transmission coil unit may not include a power transmission-side capacitor.

In the power transmission coil unit 203 of the embodiment, a reactor Ls is configured to be inserted in series with the power transmission-side capacitor C1. In the case of this configuration, an imaginary part of an impedance of a wireless power transmission network constituted by the power transmission coil unit 203, the power receiving coil unit 301, the rectification smoothing circuit 303 and the load Vload is easily controlled such that it becomes positive. The reactor Ls has an impedance which is higher than a frequency component that is sufficiently higher than a resonance frequency on the side of the power transmission coil unit 203. Accordingly, the reactor Ls can function as a filter configured to remove a high frequency component.

The power transmission coil L1 is constituted by a coil for wireless power transmission. The power transmission coil L1 of the embodiment is installed on the ground G or buried in the ground G to face a floor bottom of the electric automobile EV. Further, in the embodiment, a configuration in which the power transmission coil L1 (the power transmission coil unit 203) is installed on the ground G together with the conversion circuit 201 may be provided.

The power transmission-side capacitor C1 has a function of adjusting a resonance frequency. While the power transmission-side capacitor C1 of the embodiment is constituted by a first capacitor C11 serially connected to the power transmission coil L1 and a second capacitor C12 connected in parallel with the power transmission coil L1, the power transmission-side capacitor C1 is not limited to such a configuration. For example, the power transmission-side capacitor C1 may be constituted by only the first capacitor C11 serially connected to the power transmission coil L1.

The power receiving coil unit 301 includes a second LC resonance circuit, a base member (not shown) and a magnetic body (not shown). The base member (not shown) and the magnetic body (not shown) will be described in detail in the section for the "<Coil unit>," which will be described below.

The second LC resonance circuit includes a power receiving coil L2 and a power receiving-side capacitor C2. When a resonance frequency of the second LC resonance circuit approaches (including also "coincides with") a resonance frequency on the side of the power transmission coil unit 203, magnetic resonance type wireless power transmission becomes possible. In addition, in another embodiment, the power receiving coil unit may not include an LC resonance circuit. That is, in another embodiment, the power receiving coil unit may not include a power receiving-side capacitor.

In the power receiving coil unit 301 of the embodiment, a reactor Lr is configured to be inserted in series with the power receiving-side capacitor C2. In the case of the configuration, the reactor Lr has an impedance higher than a frequency component that is sufficiently higher than a resonance frequency on the side of the power receiving coil unit 301. Accordingly, the reactor Lr functions as a filter configured to remove a high frequency component.

The power receiving coil L2 is constituted by a coil for wireless power transmission. The power receiving coil L2 of the embodiment is installed on the floor bottom of the electric automobile EV to face the power transmission coil L1 installed on the ground G or buried in the ground G.

The power receiving-side capacitor C2 has a function of adjusting a resonance frequency. While the power receiving-side capacitor C2 of the embodiment is constituted by a third capacitor C21 serially connected to the power receiving coil L2 and a fourth capacitor C22 connected in parallel with the power receiving coil L2, the power receiving-side capacitor C2 is not limited to such a configuration. For example, the power receiving-side capacitor C2 may be constituted by only the third capacitor C21 serially connected to the power receiving coil L2.

The rectification smoothing circuit 303 is electrically connected to the power receiving coil unit 301, and rectifies an alternating current voltage supplied from the power receiving coil L2 and converts the alternating current voltage into a direct current voltage. As the rectification smoothing circuit 303, a half wave rectification smoothing circuit constituted by a switching element or a diode and a smoothing capacitor; a full wave rectification smoothing circuit constituted by four switching elements or diodes, which are bridge-connected, and a smoothing capacitor, or the like, may be exemplified. The rectification smoothing circuit 303 is electrically connected to the load Vload. The rectification smoothing circuit 303 supplies the converted direct current power to the load Vload. Further, in the wireless power receiving device 300, a configuration in which a charging circuit is installed between the rectification smoothing circuit 303 and the load Vload may be provided.

The load Vload is connected between output terminals of the rectification smoothing circuit 303 and a direct current voltage is supplied from the rectification smoothing circuit 303. As the load Vload, a battery, a motor, or the like, mounted on the above-mentioned electric automobile EV may be exemplified.

The load Vload can be regarded as a resistance load having an equivalent resistance value that varies over time according to a demand state (a storage state or a consumption state) of electric power. Further, power consumption in the rectification smoothing circuit 303 is sufficiently smaller than power consumption in the load Vload.

In the power transmission system 100 including the above-mentioned configuration, electric power can be transmitted wirelessly from the wireless power transmission device 200 to the wireless power receiving device 300 according to a magnetic resonance method using a resonance (resound) phenomenon between the power transmission coil unit 203 and the power receiving coil unit 301. That is, in the magnetic resonance method, resonance frequencies between the two coil units 203 and 301 can approach (also including "coincide with") each other, the high frequency current and voltage in the vicinity of the resonance frequency can be applied to the power transmission coil unit 203, and electric power can be transmitted (supplied) wirelessly to the power receiving coil unit 301 that electromagnetically resonates (resounds). Further, the wireless power transmission device 200 and the wireless power receiving device 300 may include a communication circuit configured to perform communication between the wireless power transmission device 200 and the wireless power receiving device 300.

Accordingly, in the power transmission system 100 of the embodiment, wireless charging of the battery mounted on the electric automobile EV can be performed while electric power supplied from the charging equipment side is transmitted wirelessly to the electric automobile EV with no connection to a charging cable.

<Coil Unit>

Figure 3:
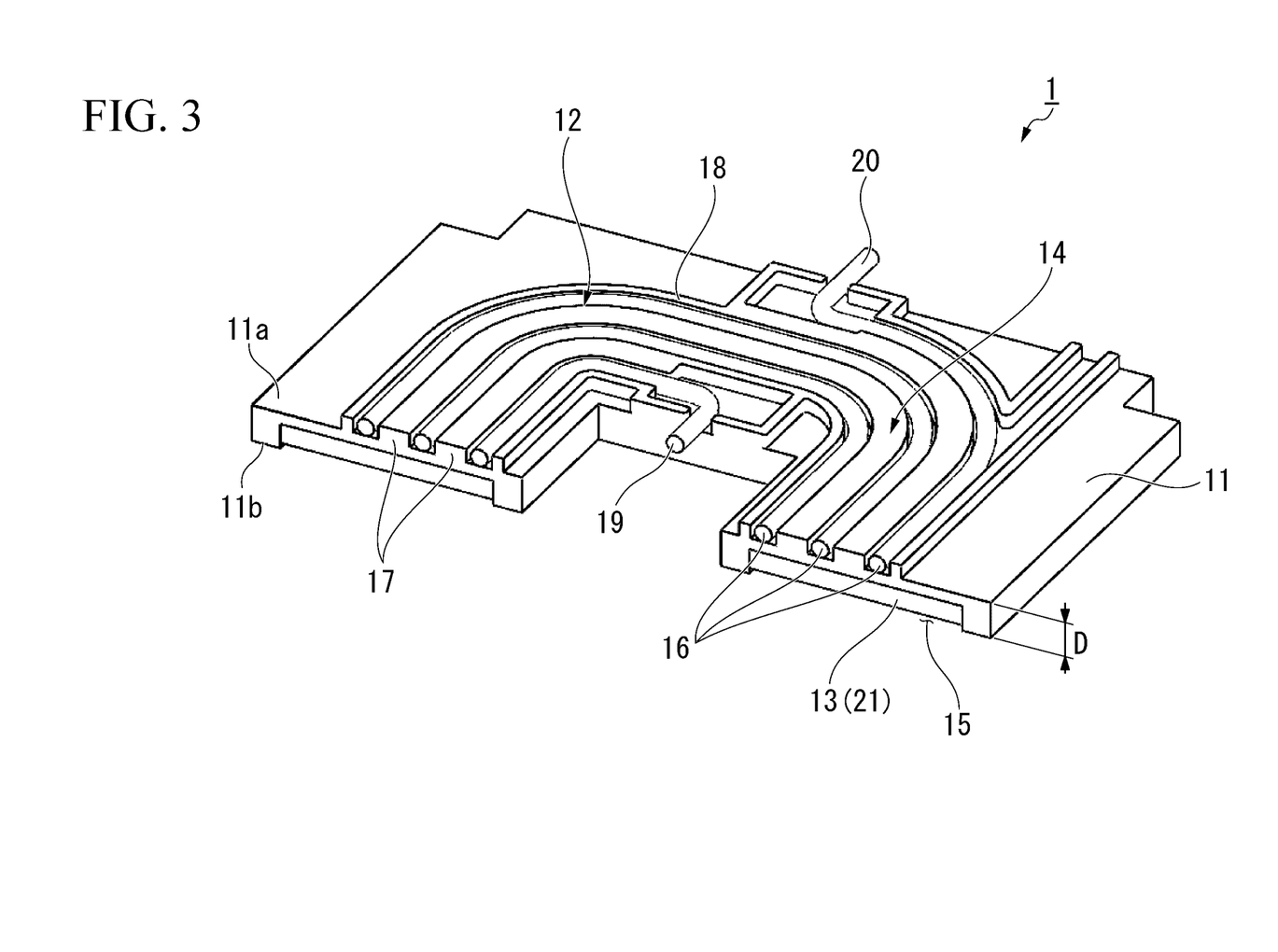
FIG. 3 is a perspective view of a cutaway model for explaining a configuration of a coil unit according to the embodiment.
Figure 4:
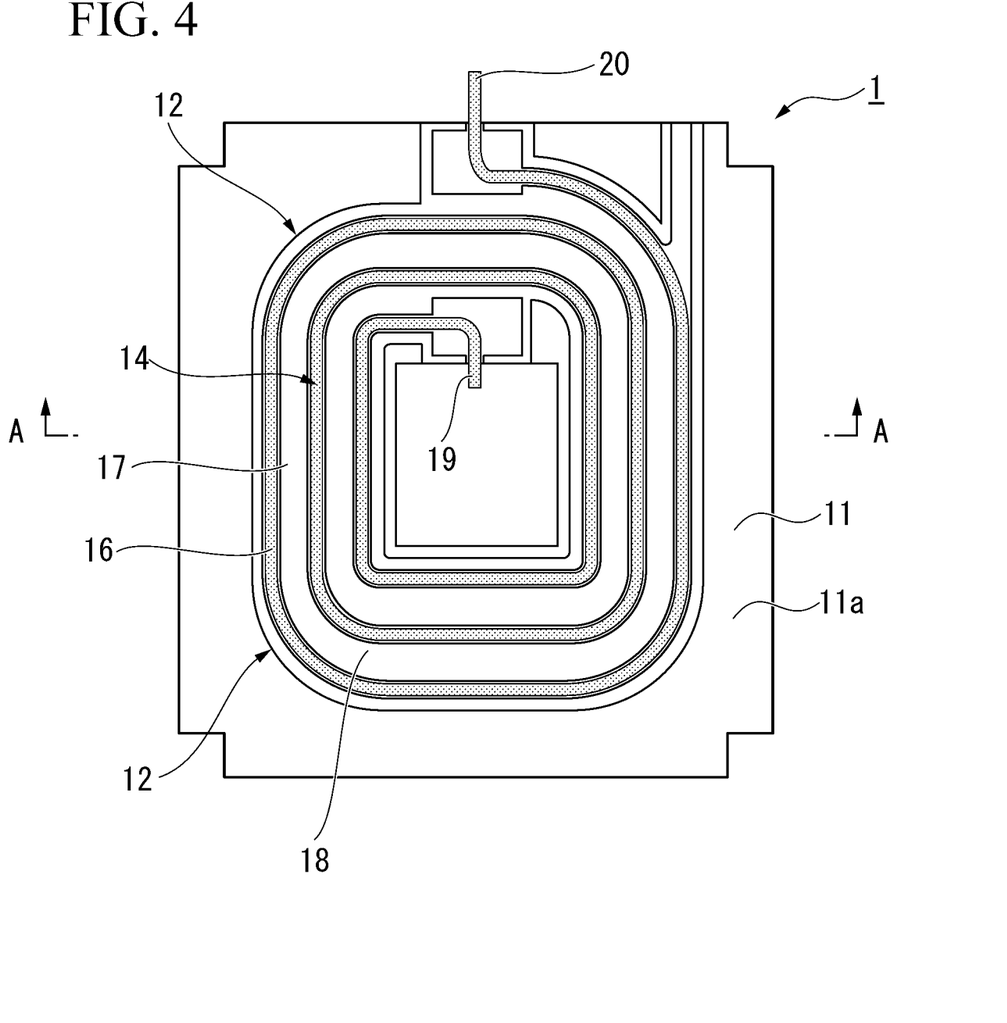
FIG. 4 is a plan view of the coil unit of FIG. 3.
Figure 5:
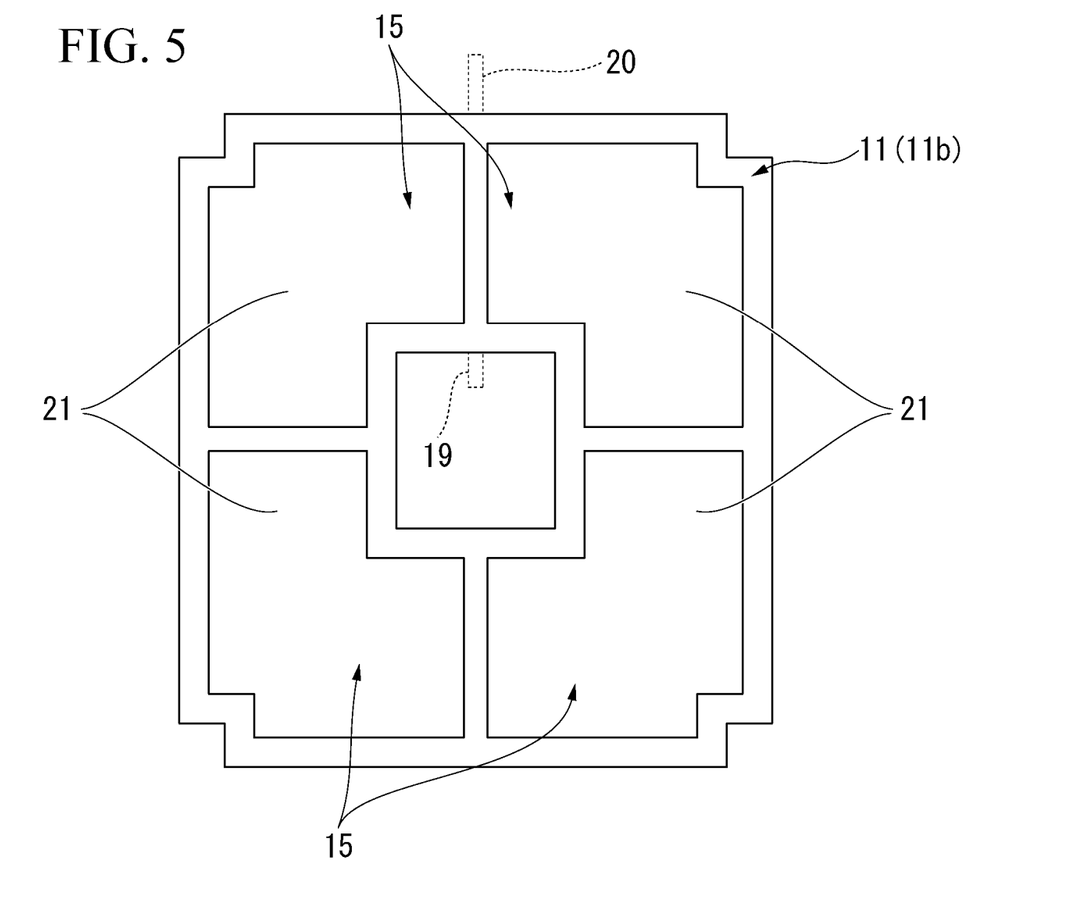
FIG. 5 is a plan view of the coil unit of FIG. 3.
Figure 6:
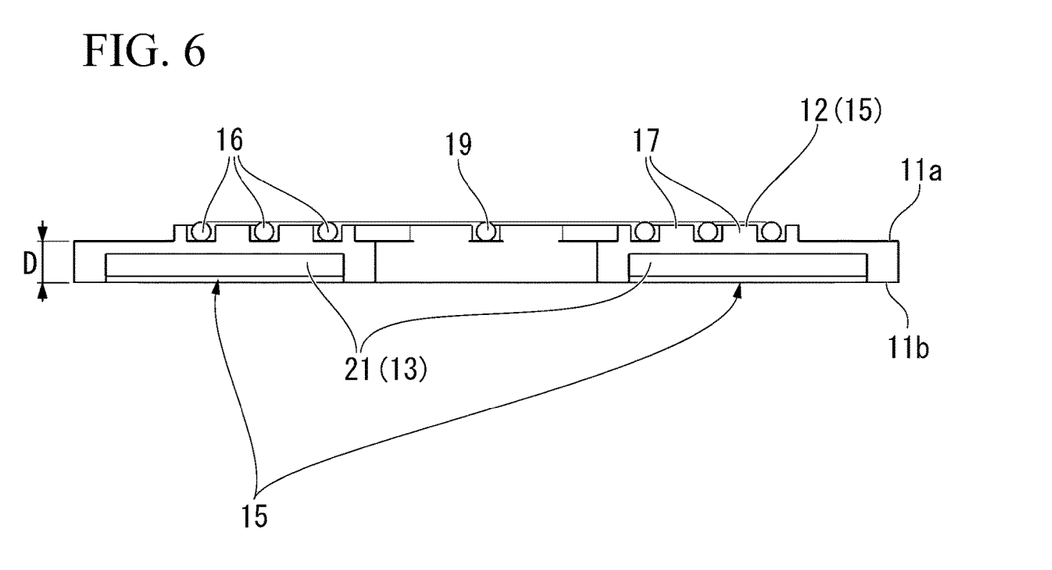
FIG. 6 is a cross-sectional view of the coil unit taken along line A-A shown in FIG. 4.

Next, as a coil unit of the embodiment, a coil unit 1 shown in FIG. 3 to FIG. 6 will be described. FIG. 3 is a perspective view of a cutaway model for explaining a configuration of the coil unit 1. FIG. 4 is a plan view of the coil unit 1. FIG. 5 is a plan view of the coil unit 1. FIG. 6 is a cross-sectional view of the coil unit 1 taken along line A-A shown in FIG. 4.

As shown in FIG. 3 to FIG. 6, the coil unit 1 includes a base member 11, a coil 12 and a magnetic body 13. In the coil unit 1, the magnetic body 13 is constituted by a plurality of (in the embodiment, four) magnetic body pieces 21. The magnetic body pieces 21 will be described. In the coil unit 1, the base member 11, the coil 12 and the magnetic body 13 are accommodated in a housing (not shown). Further, the coil unit 1 may further include a capacitor. When the coil unit 1 includes a capacitor, the capacitor is not particularly limited.

The base member 11 is disposed between the coil 12 and the magnetic body pieces 21. The base member 11 has a first surface 11a and a second surface 11b. The first surface 11a and the second surface 11b face each other and are parallel to each other. Then, a distance between the first surface 11a and the second surface 11b, i.e., a thickness D of the base member 11 is constant. While the thickness D of the base member is not particularly limited, the thickness D may be, for example, 0.5 to 5.0 mm.

The base member 11 is constituted by an insulating member. While the insulating member is not particularly limited, the insulating member may be exemplified as being of glass, a resin, or the like. However, a resin is preferably used for the insulating member. As a specific example of the resin, an acrylonitrile-butadiene-styrene copolymer resin (an ABS resin), a polybutylene terephthalate resin (a PBT resin), a polyphenylene sulfide resin (a PPS resin), or the like, may be exemplified.

In the coil unit 1, the base member 11 has a form of a bobbin. This bobbin is a part configured to allow a conductive wire 16 of the coil 12 to be wound neatly and hold a shape of the conductive wire 16 of the coil 12.

The base member 11 has a first accommodating section 14 and a second accommodating section 15.

The first accommodating section 14 accommodates the coil 12. The first accommodating section 14 is provided on the first surface 11a of the base member 11. The first accommodating section 14 has a partition wall 17 configured to be a boundary between lines of the conductive wire 16 of the coil 12. Since the partition wall 17 can minimize fluctuation of a position of the conductive wire 16 for each winding, variation in properties of the power transmission coil can be further minimized.

The partition wall 17 is provided on the first surface 11a. A height of the partition wall 17 is not particularly limited. However, the height of the partition wall 17 is preferably greater than a diameter of the conductive wire 16 and preferably 1.2 times or less than a diameter of the conductive wire 16. When the height of the partition wall 17 is greater than the diameter of the conductive wire 16, contact between the coil 12 and other members is easily prevented when an external force such as vibration, impact, or the like, is applied to the coil unit 1. In addition, when the height of the partition wall 17 is 1.2 times or less than the diameter of the conductive wire 16, the coil unit 1 can be further reduced in thickness. For this reason, when the height of the partition wall 17 is greater than the diameter of the conductive wire 16 and 1.2 times or less the diameter of the conductive wire 16, both of reduction in thickness of the coil unit 1 and prevention of contact between the coil 12 and other members can be achieved.

Further, when an influence to the coil unit 1 due to an external force such as vibration, impact, or the like, is small, the height of the partition wall 17 is preferably the diameter or less of the conductive wire 16. Accordingly, the coil unit 1 can be further reduced in thickness.

The second accommodating section 15 accommodates the magnetic body pieces 21. The second accommodating section 15 is provided on the second surface 11b of the base member 11. The second accommodating section 15 is formed in a square shape and incised toward the first surface 11a with the second surface 11b as a reference surface. That is, an incised portion configured to accommodate the magnetic body pieces 21 is formed in the second accommodating section 15. Accordingly, the coil unit 1 can be further reduced in thickness.

An incision depth of the second accommodating section 15 is not particularly limited. However, the incision depth is preferably greater than the thickness of the magnetic body pieces 21 or 1.2 times or less the thickness of the magnetic body pieces 21. In the case in which the incision depth is greater than the thickness of the magnetic body pieces 21, a contact between the magnetic body pieces 21 and another member is easily prevented when an external force such as vibrations, an impact, or the like, is applied to the coil unit 1. In addition, when the incision depth is 1.2 times or less than the thickness of the magnetic body pieces 21, the coil unit 1 can be further reduced in thickness. For this reason, when the incision depth is greater than the thickness of the magnetic body pieces 21 and 1.2 times or less than the thickness of the magnetic body pieces 21, both of reduction in thickness of the coil unit 1 and prevention of a contact between the magnetic body pieces 21 and another member can be achieved. Further, the incision depth is measured using the second surface 11b as a reference surface.

Further, when an influence on the coil unit 1 due to an external force such as vibrations, an impact, or the like, is small, the incision depth is preferably the thickness or less of the magnetic body pieces 21. Accordingly, the coil unit 1 can be further reduced in thickness.

In the embodiment, the second accommodating section 15 is divided into a plurality of (four) regions. In this way, in the coil unit 1, the plurality of magnetic body pieces 21 are divided into a plurality of second accommodating sections 15. Accordingly, a deviation in size of gaps formed in the second accommodating section 15 due to dimensional variation of the magnetic body pieces 21 can be minimized, and variation in properties of the power transmission coil can be further minimized.

Specifically, for example, in the case in which there is one second accommodating section 15, when magnetic body pieces are filled into and accommodated in the second accommodating section 15 from ends thereof, gaps may occur in portions of the second accommodating section 15. Accordingly, the magnetic symmetry breaks down, and variation in properties of the power transmission coil readily occurs. Meanwhile, in the case in which a plurality of second accommodating sections 15 are provided, when the plurality of magnetic body pieces 21 are filled into and accommodated in the second accommodating sections 15 from ends thereof, respectively, while gaps occur in portions of the second accommodating sections 15, symmetry can be provided in the gaps between the second accommodating sections 15. Accordingly, magnetic symmetry cannot be easily collapsed in the power transmission coil as a whole, and variation in properties of the power transmission coil can be further minimized.

The coil 12 has a winding section 18, a first wiring section 19 and a second wiring section 20.

The winding section 18 is a portion configured by winding the conductive wire 16 in a spiral shape. The conductive wire 16 may be a Litz wire including, for example, copper, aluminum, or the like.

The first wiring section 19 is a portion in which the conductive wire 16 extends from an end portion (a first end portion of the coil 12) on an inner circumferential side of the winding section 18 toward the circumferential inside of the winding section 18.

The second wiring section 20 is a portion in which the conductive wire 16 extends from an end portion (a second end portion of the coil 12) on an outer circumferential side of the winding section 18 toward the circumferential outside.

The coil 12 may also be used as the power transmission coil L1 or the power receiving coil L2.

The magnetic body piece 21 is a plate-shaped member having a square-shaped surface. The square-shaped surface of the magnetic body piece 21 is smaller than a surface of the second accommodating section 15 configured to accommodate the magnetic body pieces 21. A face of the square-shaped surface of the magnetic body piece 21 is coated with a first potting resin (not shown), which will be described below, and fixed to an accommodating surface of the second accommodating section 15. The accommodating surface of the second accommodating section 15 is a surface of the second accommodating section 15 configured to accommodate the magnetic body pieces 21.

The magnetic body pieces 21 are constituted of ferrite, as an example. Coupling between the coils can be increased via the magnetic body pieces 21.

The magnetic body pieces 21 are fixed to the base member 11 using a first potting resin (not shown) in the second accommodating section 15. The first potting resin fixes the magnetic body pieces 21 to the accommodating surface of the second accommodating section 15 by coating the faces of the square-shaped surfaces of the magnetic body pieces 21. Accordingly, even when the magnetic body pieces 21 are separated due an impact or the like, scattering of the divided magnetic body pieces 21 can be prevented.

The first potting resin is not particularly limited. However, a thermosetting resin is preferable as the first potting resin. As a specific example of the thermosetting resin, an acryl resin, a phenol resin, a polyester resin, an epoxy resin, a thermosetting polyimide, a silicone resin, a polyurethane resin, or the like, may be exemplified. The thermoplastic resin is not limited to these examples.

In manufacture with a magnetic material such as conventional ferrite or the like, because of undergoing a process such as baking or the like, dimensional errors easily occur, and variation in properties of the power transmission coil may occur due to dimensional errors in a magnetic body. On the other hand, the coil unit 1 is less susceptible to dimensional errors in the magnetic body due to disposing the plurality of magnetic body pieces 21 in the plurality of second accommodating sections 15 by separating them. In addition, deviations in gaps formed in the second accommodating section 15 due to a dimensional variation of the magnetic body pieces 21 can be minimized. As a result, variation in properties of the power transmission coil can be further minimized.

While the example in which the first accommodating section 14 has the partition wall 17 has been described exemplarily in the coil unit 1 of the embodiment, the partition wall 17 may be omitted in another variant. In this case, a coil configured by winding the conductive wire 16 in a spiral shape is accommodated in the first accommodating section 14. In addition, the first accommodating section 14 may have a shape engraved toward the second surface 11b using the first surface 11a as a reference surface.

While the example in which the second accommodating section 15 is formed to be engraved toward the first surface 11a has been described exemplarily in the coil unit 1 of the embodiment, another variant may have a configuration in which the second accommodating section 15 includes a protrusion configured to accommodate a magnetic body. In this case, the protrusion is provided on the second surface 11b using a direction from the first surface 11a toward the second surface 11b as a height direction of the protrusion.

While the example in which the magnetic body 13 is configured by disposing the plurality of magnetic body pieces 21 to be arranged in the plurality of second accommodating sections 15 as a whole has been described exemplarily in the coil unit 1 of the embodiment, another variant may have a configuration in which the coil unit 1 includes one magnetic body.

(Effects)

In the coil unit of the embodiment as described above, since the coil and the magnetic body are fixed to the base member disposed between the coil and the magnetic body, the base member can hold the coil and the magnetic body integrally. Further, in the coil unit of the embodiment, a thickness of the base member is constant. As described above, variation cannot easily occur in the distance between the coil and the magnetic body during actual manufacture, and variation in properties of the coil is minimized.

When the coil and the magnetic body are fixed to the base member in this way, among causes of the variation in distance between the coil and the magnetic body that easily occur in a manufacturing site, causes other than the variation in thickness of the base member can be minimized.

Figure 7:
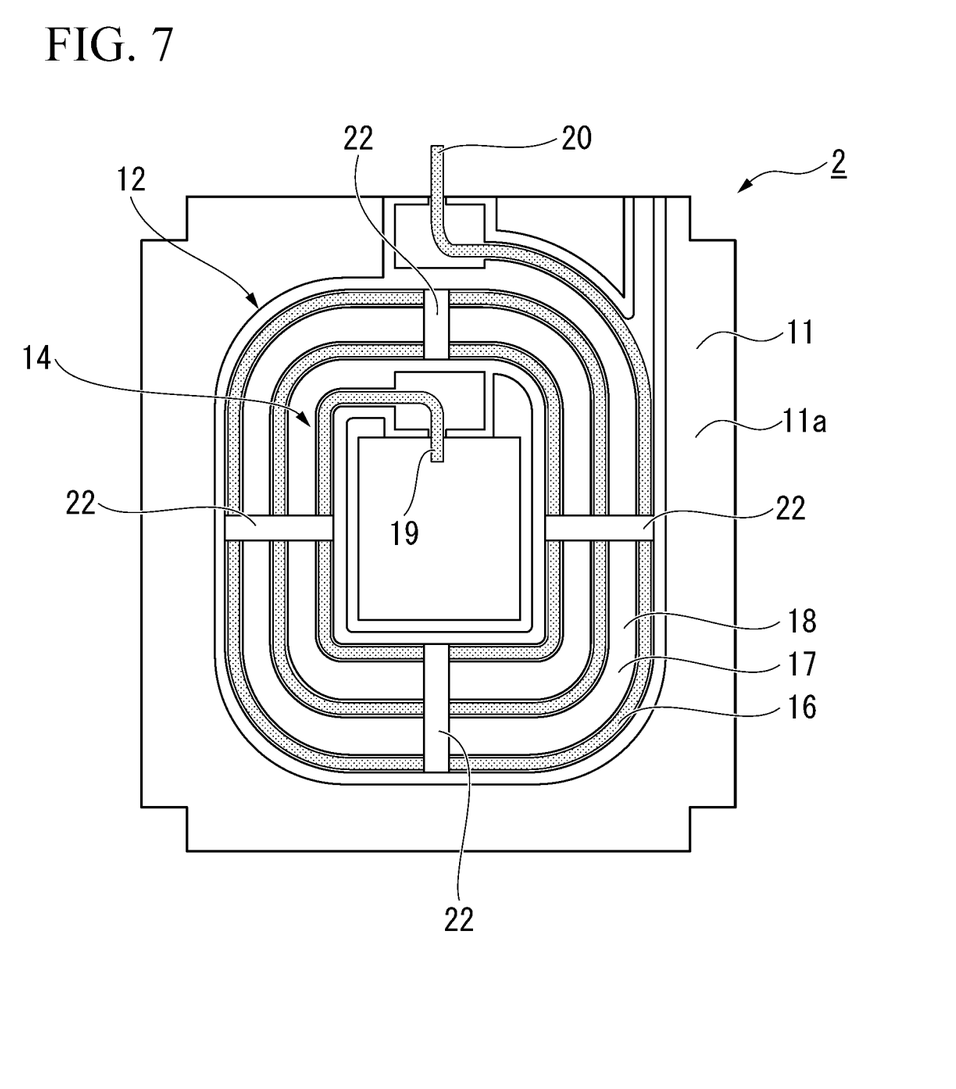
FIG. 7 is a plan view of a coil unit according to another embodiment.

FIG. 7 is a plan view of a coil unit 2 according to another embodiment. In the following description, components having the same or similar functions to the components of the coil unit 2 and the components of the coil unit 1 are designated by the same reference numerals. Descriptions of components that duplicate those of the coil unit 2 and the coil unit 1 will be omitted.

In the coil unit 2, a part of a section (the winding section 18) in which the conductive wire of coil 12 is wound in a spiral shape is fixed to the base member 11 by a second potting resin 22. When the part of the winding section 18 is fixed by the second potting resin 22 in this way, the coil 12 can be fixed to the base member 11 while an increase in weight of the coil unit 2 due to the second potting resin 22 is minimized.

The second potting resin is not particularly limited. However, a thermosetting resin is preferable as the second potting resin. A specific example of the thermosetting resin is the same as the resin exemplified as the preferable specific example of the first potting resin. The second potting resin may be the same as or may be different from the first potting resin.

Even in the coil unit 2, since the same effects as those of the coil unit 1 are obtained, variation in properties of the coil is minimized, and an increase in thickness of the coil unit is minimized.

While preferred embodiments of the invention have been described and illustrated above, it should be understood that these are exemplary of the invention and are not to be considered as limiting. Additions, omissions, substitutions, and other modifications can be made without departing from the spirit or scope of the present disclosure. Accordingly, the invention is not to be considered as being limited by the foregoing description, and is only limited by the scope of the appended claims.

EXPLANATION OF REFERENCES 1, 2: Coil unit
11: Base member
11a: First surface
11b: Second surface
12: Coil
13: Magnetic body
14: First accommodating section
15: Second accommodating section
16: Conductive wire
17: Partition wall
18: Winding section
19: First wiring section
20: Second wiring section
21: Magnetic body piece
22: Second potting resin
100: Wireless power transmission system
200: Wireless power transmission device
201: Conversion circuit
202: Power transmission circuit
203: Power transmission coil unit
300: Wireless power receiving device
301: Power receiving coil unit
303: Rectification smoothing circuit
L1: Power transmission coil
L2: Power receiving coil
C1: Power transmission-side capacitor
C2: Power receiving-side capacitor
EV: Electric automobile
Vload: Load

What is claimed is:

1. A coil unit comprising:
a coil configured by winding a conductive wire in a spiral shape;
a magnetic body; and
a base member disposed between the coil and the magnetic body, the coil and the magnetic body being fixed to the base member, the base member having:
a partition wall configured to be a boundary between neighboring lines of the conductive wire of the coil; and
an accommodating section that accommodates the magnetic body, the magnetic body being fixed to the base member through a surface of the accommodating section.

2. The coil unit according to claim 1, wherein the base member is composed of a resin.

3. The coil unit according to claim 2, wherein the base member has another accommodating section configured to accommodate the coil.

4. The coil unit according to claim 1, wherein the base member has another accommodating section configured to accommodate the coil.

5. The coil unit according to claim 1, wherein the accommodating section is divided into a plurality of regions.

6. The coil unit according to claim 1, wherein the magnetic body is constituted by a plurality of magnetic body pieces.

7. The coil unit according to claim 1, wherein the magnetic body is coated with a first potting resin and fixed to the base member.

8. The coil unit according to claim 7, wherein a portion, of a part in which the conductive wire of the coil is wound in a spiral shape, is fixed to the base member by a second potting resin.

9. A wireless power transmission device configured to transmit electric power wirelessly, the wireless power transmission device comprising:

the coil unit according to claim 1.

10. A wireless power receiving device configured to receive electric power wirelessly, the wireless power receiving device comprising:

the coil unit according to claim 1.

11. A wireless power transmission system configured to transmit electric power wirelessly from a wireless power transmission device to a wireless power receiving device, wherein at least one of the wireless power transmission device and the wireless power receiving device comprises the coil unit according to claim 1.

12. The coil unit according to claim 1, wherein the magnetic body is fixed to the base member through the surface of the accommodating section without a space between the magnetic body and the base member.

13. A coil unit comprising:

a coil configured by winding a conductive wire in a spiral shape;

a magnetic body; and a base member disposed between the coil and the magnetic body, the coil and the magnetic body being fixed to the base member, the base member having an accommodating section that accommodates the magnetic body, and an incision depth of the accommodating section in a direction perpendicular to a major surface of the base member being greater than a thickness of the magnetic body.

14. The coil unit according to claim 13, wherein the magnetic body is fixed to the base member through a surface of the accommodating section.

* * * * *